United States Patent [19]

Arkens

[11] 4,277,384
[45] Jul. 7, 1981

[54] HETEROPOLYMER ACRYLIC LATICES AND TEXTILES TREATED THEREWITH

[75] Inventor: Charles T. Arkens, Hatfield, Pa.

[73] Assignee: Rohm and Haas Company, Philadelphia, Pa.

[21] Appl. No.: 945,733

[22] Filed: Sep. 25, 1978

[51] Int. Cl.$^3$ ............................................. C08L 33/08
[52] U.S. Cl. ........................... 260/29.6 RB; 428/262; 428/253; 428/290; 428/407; 525/902
[58] Field of Search ................ 260/29.6 RB, 883, 885

[56] References Cited

U.S. PATENT DOCUMENTS

| | | | |
|---|---|---|---|
| 3,458,603 | 7/1969 | Griffin | 260/885 |
| 3,745,196 | 7/1973 | Lane | 260/883 |
| 3,787,522 | 1/1974 | Dickie | 260/885 |
| 3,971,835 | 7/1976 | Myers | 260/876 R |
| 4,086,296 | 4/1978 | Carty | 260/885 |
| 4,107,120 | 8/1978 | Plamondon | 260/29.6 RB |

*Primary Examiner*—Paul R. Michl
*Attorney, Agent, or Firm*—Lester E. Johnson

[57] ABSTRACT

Tear resistance and flexibility of resin-treated textiles are improved while retaining good low temperature properties by using as the resin an acrylic emulsion polymer wherein the latex particles have a core-shell structure. The monomers forming the core are selected to provide a Tg in the core of −20° C. or lower and the monomer composition forming the shell is selected to provide a Tg in the shell of about 60° C. to about −10° C. The core monomer composition contains 4–10 wt. % of a latent crosslinker together with 0–0.03 wt. % of an active crosslinker or a graftlinker, and the shell monomer composition contains 2–10 wt. % of a latent crosslinker.

4 Claims, No Drawings

HETEROPOLYMER ACRYLIC LATICES AND TEXTILES TREATED THEREWITH

BACKGROUND OF THE INVENTION

This invention relates to latex compositions and to their use with textile materials to improve various properties thereof, such as flexibility and resistance to seam tearing, while retaining good low temperature properties.

Commonly assigned U.S. application Ser. No. 697,171 filed June 17, 1976, now U.S. Pat. No. 4,107,120 issued Aug. 15, 1978 (incorporated herein by reference) discloses an acrylic resin latex composition which when used in the treatment of textiles provides resistance to cracking at low temperatures. Typically, the polymer compositions are used as transfer coatings on fabrics intended for home and automotive upholstery applications. In transfer coating, a polymer emulsion is formulated with various additives and cast onto embossed release paper, using a conventional roll coater and knife. The coating is then dried to give a film (typicaly about 2.5 mils thickness) and an adhesive is applied, followed by a napped and sheared fabric. After drying and curing, the composite is stripped from the release paper and, if desired, given a top finish. In a variation on the foregoing coating technique, a polymer emulsion foam is applied to the fabric before contact of the fabric with the adhesive and film/release sheet. After the foam is dried and crushed, an adhesive is applied and the crushed foam coated fabric is used in the same manner as any other fabric in the manufacture of upholstery fabric by transfer coating.

Although the polymer compositions of Ser. No. 697,171, now U.S. Pat. No. 4,107,120 issued Aug. 15, 1978 generally provide excellent properties when used as transfer coatings on fabrics or in other textile treatments, room for further improvement remains, particularly in seam tear resistance. Seam tear resistance means resistance of a polymer treated fabric to tearing along a sewn seam, as in a piece of upholstery fabric. In addition, improvements in percent elongation (stretch before exceeding elastic limit), Bally Flex and abrasion resistance are desirable. Some increase in surface tack is acceptable, since topcoating of the films formed with the polymers is commonly practiced, thus offsetting any increased tack in the polymer. However, the good low temperature properties of the polymer, such as "cold crack", must be maintained.

SUMMARY OF THE INVENTION

It has now been discovered that further property improvements can be realized in the core-shell polymer compositions of Ser. No. 697,171, now U.S. Pat. No. 4,107,120 issued Aug. 15, 1978, and in the textiles treated therewith by reducing the proportion of graftlinking monomer or active crosslinking monomer in the crosslinking monomer system used in forming the core of the core-shell polymer, from about 0.5% to 6% by weight of the total monomer composition from which the core is made, to 0–0.3% by weight. The improved polymer composition thus comprises a thermosetting acrylic latex composition wherein the latex particles comprise about 30–60%, preferably 45–55%, by weight of a polymeric core and about 70–40%, preferably 55–45%, by weight of a polymeric shell. The core is formed by emulsion polymerization of a first monomer composition consisting essentially of (a) a major amount of a principal monomer system and (b) a minor amount of a crosslinking monomer system comprising (1) 0% to 0.3% by weight on the total monomer composition of a graftlinking monomer or an active crosslinking monomer and (2) at least about 4% by weight on the total monomer composition of a latent crosslinking monomer. The shell is formed on the core by emulsion polymerization of a second monomer composition in the presence of the core polymer, the second monomer composition consisting essentially of (a) a major amount of a principal monomer system and (b) a minor amount of a latent crosslinking monomer system. The monomers of the first monomer composition are selected in a known manner to provide a glass transition temperature (Tg) in the core of $-20°$ C. or lower, and the monomers of the second monomer composition are selected in a known manner to provide a Tg in the shell of about $60°$ C. to about $-10°$ C.

Textiles of all types are beneficially treated with the acrylic polymer latices in accordance with the invention. Application techniques include direct coating, transfer film application, lamination or any other technique known in the art.

In this specification the term "acrylic" is used in a general sense to describe polymers wherein at least one of the monomers is of the acrylic or methacrylic type, including acids, esters, amides and substituted derivatives thereof.

DETAILED DESCRIPTION

The monomers forming the polymeric core of the heteropolymer are selected to provide a glass transition temperature (Tg) in the core of $-20°$ C. or lower. It is believed that the resulting rubbery character of the core in cooperation with the crosslinking character of core and shell results in the cracking resistance and flexibility at room temperature and low temperature as well as the impact resistance provided by the finished polymer.

The core polymer is formed by emulsion polymerization of a first monomer composition comprising a major amount of a principal monomer system and a minor amount of a crosslinking monomer system. The principal monomer system typically contains a $C_1$–$C_8$ alkyl acrylate wherein the alkyl group is straight or branched chain, such as ethyl acrylate, butyl acrylate, 2-ethylhexyl acrylate, and mixtures thereof. Part of the alkyl acrylate, up to a maximum of about 20% by weight, may be replaced with a non-crosslinking (with respect to the alkyl acrylate) monoethylenically unsaturated monomer having alpha, beta-unsaturation. Examples of such other monomers are vinylidene chloride, vinyl chloride, acrylonitrile, vinyl esters such as vinyl formate, vinyl acetate and vinyl propionate, and mixtures of ethylene and such vinyl esters, alkyl methacrylic esters, acrylic and methacrylic acid esters of alcoholethers such as diethylene glycol monoethyl or monobutyl ether, styrene, ring-alkyl styrenes such as ortho-, meta and paramethyl styrenes, alpha-alkyl styrenes such as alpha-methyl styrene and the like, mixtures of ethylene with other alpha olefins such as propylene, butylene, pentene and the like, and combinations of ethylene with vinyl ethers such as methyl vinyl ether, ethyl vinyl ether, vinyl 2-methoxyethyl ether, vinyl 2-chloroethyl ether and the like.

Of the foregoing monomers, butyl acrylate is particularly preferred alone or in combination with minor amounts of methyl methacrylate, of the order of about 70–95% by weight of butyl acrylate and about 1–15% by weight of methyl methacrylate, based on the total weight of the monomers in the monomer composition forming the core polymer.

Careful selection of the crosslinking monomer system both in the core monomer composition and in the shell monomer composition is important for obtaining the proper balance of properties in fabrics treated with the heteropolymer. The crosslinking monomer system in the monomer composition forming the core comprises:
1. 0% to 0.3% (preferably 0%) on total monomer composition weight of a graftlinking monomer or an active crosslinking monomer, and
2. At least about 4% (for example, 4–10%) on total monomer composition weight of a latent crosslinking monomer.

Generally, the amount of graftlinking or active crosslinking monomer in the core monomer composition should be that which will provide sufficient mutual insolubility of the core and shell polymer compositions for formation of a true heteropolymer and which will not unduly reduce the elongation properties of the heteropolymer. This will depend, of course, on other monomers in the monomer compositions of both core and shell, and may be varied accordingly.

The shell monomer composition requires only a latent crosslinker. Upon polymerization of the shell monomer composition in the presence of the core polymer, the shell polymer composition becomes intimately associated with the core, if not actually graftlinked, through the condensation reactions possible with the latent crosslinking monomers present in the core and shell polymer compositions. It appears that the shell contributes significantly to the good abrasion-resistance, solvent resistance and launderability of the textiles treated with the heteropolymer by virtue either of graftlinking of the shell polymer onto the core polymer or of tight formation of the shell over the core short of actual graftlinking.

For the purposes of this description, the term "latent crosslinking monomer" means a polyfunctional monomer wherein a portion of the functionality enters into the copolymerization with other monomers in the monomer composition forming the core or the shell, the residual functionality causing crosslinking of the polymeric core of shell upon subsequent complete drying of the latex particles on a textile substrate material treated therewith. Generally, such latent crosslinking monomers are amides or N-alkylolamides of alpha, beta-ethylenically unsaturated carboxylic acids having 4–10 carbons, such as acrylamide, methacrylamide, N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide and the like, and others. The preferred monomers of the N-alkylol amide type, because of their ready availability and relative low cost, are the N-alkylol amides of alpha, beta-monoolefinically unsaturated monocarboxylic acids, such as N-methylol acrylamide and N-methylol methacrylamide. Other preferred latent crosslinking monomer systems are mixtures such as equimolar mixtures of acrylamide and N-methylol acrylamide or of methacrylamide and N-methylol methacrylamide. The latent crosslinking monomers are known to impart self-curing characteristics to compositions containing them. The cure may be enhanced by reaction with an active hydrogen containing resin added to coating formulations containing the core or shell monomer compositions or the heteropolymers, such as the triazine-formaldehyde and urea-formaldehyde resins. In either case, full cure occurs upon complete drying of the compositions on the textile substrates treated therewith.

By the term "active crosslinking monomer" is meant a polyfunctional monomer which crosslinks a polymer composition during the initial formation thereof. Subsequent drying or other curing techniques are not required. Monomers of this type are well-known and comprise monomers wherein the functionality is of substantially equivalent reactivity so that uniform crosslinking occurs. Typically, such monomers contain at least two addition polymerizable vinylidene groups and are alpha, beta-ethylenically unsaturated monocarboxylic acid esters of polyhydric alcohols containing 2–6 ester groups. Suitable preferred active crosslinking monomers include alkylene glycol diacrylates and dimethacrylates such as ethylene glycol diacrylate, 1,3-butylene glycol diacrylate, 1,4-butylene glycol diacrylate propylene glycol diacrylate, triethylene glycol dimethacrylate, etc.; 1,3-glycerol dimethacrylate, 1,1,1-trimethylol propane dimethacrylate, 1,1,1-trimethylol ethane diacrylate, pentaerythritol trimethacrylate, 1,2,6-hexane triacrylate, sorbitol pentamethacrylate, etc. Other useful crosslinkers include methylene bisacrylamide, methylene bismethacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, hexatriene, diallyl cyanamide, ethylene glycol divinyl ether, diallyl phthalate, divinyl dimethyl silane, glycerol trivinyl ether, divinyl adipate, etc.

By "graftlinking monomer" is meant a polyfunctional monomer wherein the functionality has different reactivity. This results in a portion of the functionality entering into the formation of the core polymer and the remaining functionality being pendant from the core polymer and capable of reacting with suitable functionality of the shell monomer composition to graft the shell upon the core polymer. Typically, the graftlinking monomers have at least two copolymerizable ethylenically unsaturated bonds which react at substantially different rates and comprise allyl esters of alpha, beta-unsaturated mono- and dicarboxylic acids having terminal ethylenic unsaturation. Typical useful esters include allyl methacrylate, allyl acrylate, diallyl maleate, diallyl fumarate and diallyl itaconate.

The monomers of the composition forming the shell polymer may be the same as the monomers of the core polymer composition or may be different, provided the glass transition temperature in the shell is about 60° C. to about −10° C., preferably about 25° C. to about −10° C. A Tg in the shell higher than this range normally makes the heteropolymer unsuitable for use in the treatment of textiles due to stiff or papery hand and poor flexibility. A Tg in the 25° C. to 60° C. range, although somewhat harder than necessary for many applications or locations, may be tolerable in warmer or continuously hot climates.

The amount of latent crosslinking monomer or monomers of the second shell monomer composition is at least about 2% by weight, based on the total weight of the second monomer composition. A useful range is 2-10%, preferably 5-8%.

The Tg of the core polymer composition and shell polymer composition are determinable in a known manner either experimentally or by calculation. The method of calculating the Tg based upon the Tg of homopolymers of individual monomers is described by Fox, Bull. Am. Physics Soc. 1, 3, page 123 (1956). Examples of the Tg of the homopolymers which permit such calculations are the following:

| HOMOPOLYMER OF | Tg |
|---|---|
| n-octyl acrylate | −80° C. |
| n-decyl methacrylate | −60° C. |
| 2-ethylhexyl acrylate | −70° C. |
| octyl methacrylate | −20° C. |
| n-tetradecyl methacrylate | 9° C. |
| methyl acrylate | 9° C. |
| n-tetradecyl acrylate | 20° C. |
| methyl methacrylate | 105° C. |
| acrylic acid | 106° C. |

Monomers may be selected to obtain the appropriate Tg through use of the "Rohm and Haas Acrylic Glass Temperature Analyzer", publication CM-24L/cb of Rohm and Haas Company, Philadelphia, Pennsylvania.

The heteropolymer compositions are prepared by emulsion polymerization techniques based on a two-stage polymerization and gradual addition of the monomer emulsions in each of the two stages. While it is advantageous to initiate and catalyze the reaction in each stage in a conventional manner, wherein the initiator is activated either thermally or by a redox reaction, thermal initiation is preferred from the standpoint of better storage stability of the resulting polymer emulsion and balance of properties as a textile treating resin. The latex particle size should be relatively small, of the order of about 300 nm or less, preferably about 150-200 nm. As is well-known, given the same polymer backbone, particle size is controlled primarily by the type and level of emulsifier used in each stage of the emulsion polymerization. Molecular weight of the heteropolymers generally is of the order of about 70,000 to 2,000,000, preferably about 250,000 to 1,000,000.

The foregoing and other aspects of two-stage heteropolymer emulsion polymerization are well-known as described, for example, in U.S. Pat. Nos. 3,812,205, 3,895,082, 3,461,188 and 3,457,209 except for the critical monomer selection described herein.

Among the great variety of principal monomer compositions useful for forming the core polymer are the following compositions where the monomers total 91%:
  76-91 BA/0-15 MMA
  76-91 BA/0-15 AN
  76-91 BA/0-15 St
  46-91 BA/0-45 EA
  74-91 BA/0-17 EMA
  74-91 BA/0-17 HEMA
  74-91 BA/0-17 HPMA
  55-91 EHA/0-36 AN
  55-91 EHA/0-36 MMA
  56-86 BA/0-25 EA/0-10 MMA
  70-91 BA/0-21 VA
  46-91 BA/0-45 VCl$_2$
  26 E/66 VA
  58 Bd/33 St The crosslinking monomer systems for use with any of the foregoing monomer systems include the following where the monomers total 9%:
  4-8 MAM/0-0.3 AlMA/0-2 IA
  4-8 MlMAM/0-0.3 AlMA/0-2 IA
  4-8 MlMAM/0-0.3 EGDMA/0-2 IA
  4-8 MlAM/0-0.3 EGDMA/0-2 IA
  4-8 MlMAM/0-0.3 BDM/0-2 IA
  4-8 MlAM/0-0.3 BDM/0-2 IA Principal monomer systems for preparation of the shell polymer include the following where the monomers total 92%:
  47-67 BA/25-45 MMA
  47-67 BA/25-45 AN
  47-67 BA/25-45 St
  70-91 EA/1-22 MMA
  40-65 BA/27-52 EMA
  40-65 BA/27-52 HEMA
  40-65 BA/27-52 HPMA
  32-50 EHA/41-60 AN
  32-50 EHA/41-60 MMA
  27-47 BA/10-50 EA/15-35 MMA
  50 BA/42 VA
  15 E/77 VA
  50 EA/42 VCl$_2$
  40 Bd/52 St Crosslinking monomer systems for use within the shell monomer composition include the following monomers (total 6-8%):
  6-8 MlMAM/0-2 IA
  6-8 MlAM/0-2 IA
  2-6 MlMAM/6-2 MAM/0-2 IA
  2-6 MlAM/6-2 MAM/0-2 IA The above monomer abbreviations have the following meanings:

| BA | butyl acrylate | MMA | methyl methacrylate |
|---|---|---|---|
| St | styrene | EMA | ethyl methacrylate |
| VA | vinyl acetate | HEMA | hydroxyethyl methacrylate |
| E | ethylene | EHA | 2-ethylhexyl acrylate |
| Bd | butadiene | HPMA | hydroxypropyl methacrylate |
| IA | itaconic acid | VCl$_2$ | vinylidene chloride |
| AM | acrylamide | BDM | butylene dimethacrylate |
| AN | acrylonitrile | AlMA | allyl methacrylate |
| EA | ethyl acrylate | EGDMA | ethylene glycol dimethacrylate |
| MlMAM | N-methylol methacrylamide | MAM | methacrylamide |
| MlAM | N-methylol acrylamide | | |

A preferred heteropolymer is prepared from a first monomer composition comprising:
  70-95% by weight of a $C_1$-$C_8$ alkyl acrylate,
  0-15% by weight of a $C_1$-$C_8$ alkyl methacrylate,
  4-10% by weight of acrylamide or methacrylamide,
  0-2% by weight of itaconic acid; and a second monomer composition comprising:
  40-70% by weight of a $C_1$-$C_8$ alkyl methacrylate,
  2-10% by weight of N-methylol acrylamide, N-methylol methacrylamide, or a mixture of acrylamide and N-methylol acrylamide, or a mixture of methacrylamide and N-methylol methacrylamide, and
  0-2% by weight of itaconic acid.

The heteropolymer latices of the invention may be applied to any form of textile fabric to obtain a wide variety of useful textile articles. In one end-use application, the heteropolymer is used as a cast transfer film which is laminated with an adhesive to a suitable fabric substrate in the manufacture of upholstery materials. The adhesive in such case may be a known adhesive useful for adhering acrylic films to fabrics or, preferably, it is a foam which is applied to the fabric substrate in the form of a foamed acrylic latex.

One such foam is a latently crosslinkable acrylic polymer latex based on monomers providing a suitable Tg so that the foam will not unduly stiffen the fabric. The acrylic polymer latex may be mechanically frothed or the foam may be generated by the addition of a foaming agent. The foam preferably also contains a foam stabilizer and is applied to the fabric at a wet foam thickness of about 10-150 mils and dried but without causing crosslinking. During drying the foam may shrink up to about 30% or more, depending on its wet density. The foam is then crushed to a thickness of about 5-25% of its dry thickness or crushing may be postponed until after application of the heteropolymer top film.

Such top film normally is formed by depositing the thermosettable heteropolymer latex onto release paper, drying the composition without thermosetting, positioning the film while still on the release paper over the foam, and then laminating the fabric foam and top film together at a suitable pressure and temperature to cause crushing, consolidation and thermosetting of the materials together. Preferably the release paper is removed before lamination. The heteropolymer film thus provides a highly effective wear layer over the crushed foam. A top film thickness of the order of about 0.1-5 mils, preferably about 1.5-2.5 mils, is suitable for this purpose.

The foregoing and other details of laminated textile fabrics, where a heteropolymer of this invention may be used as a top film over a crushed foam, are set forth in U.S. Pat. No. Re. 28,682 to Hoey, reissued Jan. 13, 1976.

Cast heteropolymer films of the invention may also be adhered to suitable fabric substrates by other types of adhesives, foamed or non-foamed. Such adhesives are well-known in the art and include various other acrylic polymers such as acrylonitrile and non-acrylics such as styrene/butadiene, polyvinyl chloride, polyvinyl acetate, vinyl chloride/ethylene copolymers, various urethane-type polymers, and the like. Foamed adhesives are generally preferred, and of these the water-based types are particularly preferred, due to less penetration of the fabric substrate, which penetration might result in undue stiffening of the fabric.

The heteropolymer latices of the invention are also useful for direct application in a foamed or non-foamed state to various types of fabric substrates including wovens, non-wovens and knitted fabrics. The latex may be applied to the fabrics in any suitable manner, such as by spraying, dipping, roll transfer, knife coating or the like. In the case of treatment of non-wovens, similar techniques known in the art may be employed, such as the procedures, fabrics and devices described in U.S. Pat. No. 3,157,562. A concentration of polymer in the latex of about 10-70% by weight, preferably about 40-60%, is suitable.

U.S. Pat. Nos. 3,607,341 and 3,713,868 further illustrate applications of foamed acrylic latex compositions for textile treatment wherein substitution therefor of the heteropolymers of the present invention will provide improved low temperature properties.

The heteropolymer latices of the invention are also useful as finish coats for leather or leather-like fabric substrates by direct application of the latices to the substrates or by use over a crushed foam in the manner of U.S. Pat. No. 3,919,451. The heteropolymer in the latter case may also constitute the polymer of the foam interlayer.

Whether used as an interlayer or as a toplayer, the heteropolymers of the invention may be topcoated with various materials for further improvements such as elimination of any residual tack or tendency to grab or to soil. Such topcoats are well-known, particularly in the leather finishing art, and generally comprise polymeric materials of relatively hard character. The topcoat resins may be latices or organic solvent based topcoats of any of the known types, including acrylics, urethanes, polyvinyl chlorides, cellulose acetate butyrates, and combinations thereof.

The heteropolymer dispersions may contain any additives useful for improving various properties, such as ultraviolet light stabilizers, silicone release agents, defoamers, pigments, leveling agents, thickening agents, preservatives, heat or foam stabilizers, and the like.

The following examples further illustrate the invention. All parts and percentages are by weight, unless otherwise indicated.

EXAMPLE 1

Preparation of Heteropolymer Emulsion

The following monomer emulsions I and II are prepared:

|  | Monomer Emulsion | |
| --- | --- | --- |
|  | I | II |
| Sodium lauryl sulfate (28%) | 36.9 g. | 36.9 g. |
| Water | 498.0 ml. | 269.0 ml. |
| Methacrylamide (MAM) | 76.16 g. | — |
| M-methylol Methacrylamide (25%) (MIMAM) | — | 304.64 g. |
| Itaconic Acid (IA) | 10.88 g. | 10.88 g. |
| Butyl acrylate (BA) | 935.68 g. | 620.16 g. |
| Methyl methacrylate (MMA) | 65.28 g. | 380.80 g. |

To a suitable reaction vessel is added 3.805 g. sodium lauryl sulfate (28%) and 625 ml. water. The mixture is heated to 80° C. with a nitrogen flush. A gentle nitrogen blanket is maintained during the entire time following polymerization. To the mixture is then added 50 g. of Monomer Emulsion I and a catalyst solution of 3.81 g. sodium persulfate in 26 ml. water. Polymerization begins and the temperature rises about 5° C. About 5-10 minutes later, the balance of Monomer Emulsion I and 122 ml. of a catalyst solution of 3.81 g. sodium persulfate in 244 ml. water are gradually added over 1½ hours at 80°-86° C. After the addition the batch is held at 80°-85° C. for one hour. Monomer Emulsion II is then added together with the balance of the catalyst solution over 1½ hours at 80°-86° C. The reaction is held 30 minutes at 80°-86° C. followed by cooling to 55° C. and the addition of a first chaser catalyst solution containing 10 ml. of 0.15% FeSO$_4$.H$_2$O, 1.0 g. t-butyl hydroperoxide in 7 ml. water and 0.87 g. sodium formaldehyde sulfoxylate in 17 ml. water. About a 1° C. exotherm occurs. 15 minutes later, a second chaser catalyst solution (same as first chaser except for absence of FeSO$_4$.H$_2$O solution) is added. A third chaser catalyst solution (same as second chaser) is added 15 minutes later and the reaction mixture is held for 15 minutes, cooled and filtered.

The resulting heteropolymer latex is characterized as follows:

Composition:
Core polymer: BA/MMA/MAM/IA, 86/6/7/1 (wt.%)
Shell polymer: BA/MMA/MlMAM/IA, 57/35/7/1 (wt.%)
Core/Shell weight ratio: 50/50
Solids: 50.5%

EXAMPLES 2-6

Polymer emulsions were prepared having the following compositions (Table I) where the monomer abbreviations are as identified in Example 1. Preparation was substantially as described in Example 1 above and solids and core/shell ratios were substantially the same as in Example 1.

TABLE I

| EX. NO. | POLYMER COMPOSITION (CORE//SHELL) |
|---|---|
| 2 | 86 BA/6 MMA/7 MAM/1 IA//52 BA/40 MMA/7 MlMAM/1 IA |
| 3 | 86 BA/6 MMA/7 MAM/1 IA//47 BA/45 MMA/7 MlMAM/1 IA |
| 4 | 81 BA/11 MMA/7 MAM/1 IA//57 BA/35 MMA/7 MlMAM/1 IA |
| 5 | 76 BA/16 MMA/7 MAM/1 IA//57 BA/35 MMA/7 MlMAM/1 IA |
| 6 | 86 BA/5.9 MMA/0.1 ALMA/7 MAM/1 IA//57 BA 35 MMA/7 MlMAM/1 IA |

EXAMPLE 7

Typically, the polymer latices of Examples 1-6 are formulated as follows and deaerated to avoid pinholes in the films cast therefrom:

| Ingredient | | Parts by Weight |
|---|---|---|
| Polymer latex | | 100.0 |
| Carbon Black (Harshaw) | | 2.0 |
| Silicon Emulsion (Dow Corning HV-490) | | 2.1 |
| Propylene glycol | | 1.0 |
| Thickener (Rohm and Haas Co. Acrysol ASE-60) | | 0.7 |
| Water | premix | 0.7 |
| Ammonium Hydroxide | | 0.7 |
| | | 107.2 |
| Viscosity: | 3,500 cps (Brookfield RVF #6/20 rpm) | |
| pH: | 9.2 | |

Fabric samples were transfer coated with the foregoing formulations by (1) forming an acrylic polymer foam on cotton twill fabric in a conventional manner, (2) casting the polymer formulation onto embossed silicone-coated release paper and drying to give a dry film of about 2.5 mils thickness, (3) applying an acrylic adhesive to the film, and (4) laminating the film to the crushed foam side of the fabric. The composite was then stripped from the release paper. The crushed foam was prepared from a thermosetting acrylic polymer emulsion by whipping air into the emulsion. The foam was cast onto the fabric to about a 60 mil wet thickness and dried about 5 minutes at about 250° F. The acrylic adhesive has the same polymer composition as the polymer of the acrylic foam. Lamination conditions typically were about 3 seconds at 180° F. under a pressure of 30 tons. During the lamination the acrylic foam was partially crushed and thermoset.

Table II below compares the test results for polymer compositions of the invention wherein the blocking and cold crack data are for the crushed foam coated fabric composites described above and the tensile strengths and % elongation are from cast films not adhered to the fabrics. These experiments show that surface tack can be reduced by increasing the hardness of the core or shell of the polymer but that cold crack is adversely affected by either modification. It was surprising that increased hardness of the core had a more pronounced effect on cold crack than increased hardness of the shell. However, all of the polymers of Table II have good Bally Flex and Seam Tear resistance and therefore are useful products according to the invention.

TABLE II

| | Polymer Films | | Textile Construction | |
|---|---|---|---|---|
| Film Ex. | Tensile Strength, psi | % Elongation | Blocking | Cold Crack, °C. |
| 1 | 850 | 390 | 3 ½ | −28.9 |
| 2 | 1,000 | 320 | 2 ½ | −28.3 |
| 3 | 1,250 | 285 | 1 | −27.8 |
| 4 | 890 | 350 | 3 | −23.3 |
| 5 | 950 | 375 | 2 ½ | −20.6 |
| 6 | 875 | 370 | 3 | −28.9 |

EXAMPLE 8

Table III below shows the effect of varying the content of crosslinker in the core composition of a polymer on properties of polymer films and textile constructions prepared essentially as described in Example 7. Samples A and B are representative of polymer compositions of U.S. application Ser. No. 697,171. The polymers of samples A-F differ essentially only in crosslinker level and may be characterized as follows, where x is the percentage of graft linking monomer (ALMA):

Core: 86 BA/(6-x) MMA/7 MAM/1 IA/x ALMA
Shell: 57 BA/35 MMA/7 MlMAM/1 IA

Although blocking (tack) has been increased by lowering the crosslinker level, this is of no consequence because the final constructions are conventionally top-coated, thus eliminating tack. The actual degree of tack varies depending on principal monomer compositions of the core and shell, and core/shell ratios. Of great significance is the combination of vastly improved Bally Flex and Seam Tear resistance. These results were surprising and unexpected, and demonstrate the substantial improvements offered by the polymer latices of the invention.

TABLE III

| Sample | % Crosslinker[1] | Polymer Films % Elongation | Textile Constructions | | |
| | | | Surface Blocking[2] | Bally Flex[3] | Seam Tear Test[4] |
|---|---|---|---|---|---|
| A | 1.0 | 115 | 1 | 65,000 | 6,000 |
| B | 0.5 | 135 | 2 | 160,000 | 40,000 |
| C | 0.3 | 200 | 2 | 500,000 | 65,000 |
| D | 0.2 | 225 | 2 | 550,000 | 100,000 |
| E | 0.1 | 245 | 2 | 600,000 | 250,000 |

TABLE III-continued

| Sample | % Crosslinker[1] | Polymer Films % Elongation | Textile Constructions Surface Blocking[2] | Bally Flex[3] | Seam Tear Test[4] |
|---|---|---|---|---|---|
| F(Ex. 1) | 0.0 | 270 | 3 | 700,000 | 1,000,000 |

[1] allyl methacrylate
[2] Lower number has less blocking
[3] Cycles - higher numbers better
[4] Modified Test using Newark Flex tester. Cycles - higher numbers better.

EXAMPLE 9

This example describes preparation of fabric prepared by conventional transfer coating as contrasted with transfer coating using a crushed foam (Examples 7 and 8). Polymer, fabric and processing conditions are otherwise essentially as described in Examples 7 and 8.

An embossed silicone or polypropylene coated release paper is knife-coated over a roll with a polymer emulsion such as described in Examples 1-6 to a wet thickness of 4-5 mils. The coating is dried to a B stage and a film thickness of about 2 mils in a three-zone oven with temperatures set as follows: zone 1, 150° F.; zone 2, 200° F.; and zone 3, 250° F. Using a three-roll reverse roll or knife-over-roll coater, a thermosetting acrylic polymeric emulsion is applied to the dried film as an adhesive. A napped and sheared fabric is then placed in the wet adhesive, nap side down, and the composite is laminated at 60-80 psi. pressure. The composite is then dried and cured in a second, three-zone oven using the following temperatures: zone 1, 215° F.; zone 2, 280° F.; and zone 3, 330° F. The release paper is thereafter stripped away and the composite rolled up. A topfinish is then typically applied in a separate line. The resulting coated fabric is suitable for upholstery, handbag and other simulated leather uses, and resists cracking at −28.9° C. Other properties are substantially as described in Examples 7 and 8.

Test Procedures (1) Blocking (tack): A 5" by 5" fabric sample is folded face to face and diagonally to form a triangle. A weight which produces a force of 1 psi is placed on the sample and left in a 140° F. oven for 16 hours. The weight is removed from the sample which is then taken from the oven and allowed to cool for 30 minutes. The sample is gripped by one corner and rated as follows wherein values of 0, 1 and 2 indicate acceptability:

0 = no tack, sample unfolds under own weight.
1 = sample unfolds with a shake
2 = sample easily pulled apart
3 = moderate sticking
4 = heavy sticking
5 = severe sticking—sample damaged (2) Bally Flex: A room temperature flexibility test as described in Society of Leather Technologists and Chemists, Method SLP-14. The data represents the number of cycles survived by the sample. 100,000 or more cycles indicates excellent performance.

(3) Cold Crack: ASTM D-1790-62 modified as follows: A 1"×3" fabric sample is placed in a cold box and allowed to come to equilibrium at 30° F. A loop is formed with the heteropolymer film side facing out, and a 4 lb. weight is dropped 9 inches onto the edge of the loop. The sample is examined for cracks. The temperature is lowered in 10° F. increments until failure occurs. The lowest temperature at which the sample passes is recorded as the cold crack temperature.

(4) Seam Tear Test: A 4"×5" test fabric sample is cut, folded in half face-to-face and sewn ½" in from the folded edge, 6 stitches/inch. The sample is then taped to the cylinders of a Newark Flex tester (ASTM D-1097-69) with the sewn seam perpendicular to the stroke direction. The samples are mounted so that stress is placed on the seam at maximum stroke extension. The sample is run until stitch to stitch tearing of film occurs in several places.

(5) Elongation (%): Determined on polymer film samples by ASTM test method D882-75 b. The samples are tested at 2 inches/minute and % elongation is calculated by the formula $$\left(\frac{X-Y}{Y}\right) \times 100$$

where X is the length (inches) at moment of rupture of the stretched sample and Y is the original length (inches) of the elongation section. Of polymers providing comparable tensile strength, those having greater elongation have greater work-to-break, that is, provide tougher films because more energy is required to reach failure. Thus, tearing in a film of higher elongation is not initiated easily. However, once initiated, a tear will propogate easily even in a film of high elongation. Hence, high elongation alone does not provide a superior film. Bally Flex and Seam Tear Resistance must be considered.

I claim:

1. As a textile treating composition, an acrylic latex, the particles of which comprise about 30-60% by weight of polymeric core and about 70-40% by weight of a polymeric shell, wherein said core is formed by emulsion polymerization of a first monomer composition consisting essentially of:

70-95% by weight of a $C_1$-$C_8$ alkyl acrylate,
0-15% by weight of a $C_1$-$C_8$ alkyl methacrylate,
4-10% by weight of acrylamide or methacrylamide,
0-0.3% by weight of allyl methacrylate, and
0-2% by weight of itaconic acid;

and wherein said shell is formed on said core by emulsion polymerization of a second monomer composition in the presence of said core, said second monomer composition consisting essentially of:

40-70% by weight of a $C_1$-$C_8$ alkyl acrylate,
20-50% by weight of a $C_1$-$C_8$ alkyl methacrylate,
2-10% by weight of N-methylolacrylamide, N-methylol methacrylamide, or a mixture of methacrylamide and N-methylolacrylamide, and
0-2% by weight of itaconic acid.

2. The composition of claim 1 wherein the $C_1$-$C_8$ alkyl acrylate in the first and second monomer compositions is butyl acrylate, and the $C_1$-$C_8$ alkyl methacrylate in the first and second monomer compositions is methyl methacrylate.

3. The composition of claim 2 wherein the first monomer composition consists essentially of:
  about 76–86% by weight of butyl acrylate,
  about 6–15% by weight of methyl methacrylate,
  about 7% by weight of methacrylamide and
  about 1% by weight of itaconic acid;
and wherein the second monomer composition consists essentially of:
  47–57% by weight of butyl acrylate,
  about 35–45% by weight of methyl methacrylate,
  about 7% by weight of a 1:1 molar mixture of N-methylolmethacrylamide and methacrylamide, and
  about 1% by weight of itaconic acid.

4. As a textile treating composition, an acrylic latex, the particles of which comprise about 30–60% by weight of polymeric core and about 70–40% by weight of a polymeric shell, wherein said core is formed by emulsion polymerization of a first monomer composition consisting essentially of:
  about 86% by weight of butyl acrylate,
  about 6% by weight of methyl methacrylate,
  about 7% by weight of methacrylamide, and
  about 1% by weight of itaconic acid;
and wherein said shell is formed on said core by emulsion polymerization of a second monomer composition in the presence of said core, said second monomer composition consisting essentially of:
  about 57% by weight of butyl acrylate,
  about 35% by weight of methyl methacrylate,
  about 7% by weight of a 1:1 molar mixture of N-methylolmethacrylamide and methacrylamide, and
  about 1% by weight of itaconic acid.

* * * * *